(12) United States Patent
Wang (10) Patent No.: US 8,675,477 B2
(45) Date of Patent: Mar. 18, 2014

(54) ADDRESS REFRESHING METHOD AND DEVICE OF ETHERNET RING NETWORK

(75) Inventor: Bin Wang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 243 days.

(21) Appl. No.: 13/131,249

(22) PCT Filed: Dec. 27, 2008

(86) PCT No.: PCT/CN2008/073798
§ 371 (c)(1),
(2), (4) Date: May 25, 2011

(87) PCT Pub. No.: WO2010/060250
PCT Pub. Date: Jun. 3, 2010

(65) Prior Publication Data
US 2011/0228667 A1    Sep. 22, 2011

(30) Foreign Application Priority Data
Nov. 25, 2008 (CN) .......................... 2008 1 0179018

(51) Int. Cl.
*G01R 31/08* (2006.01)

(52) U.S. Cl.
USPC .......................................... 370/221; 370/245

(58) Field of Classification Search
USPC .......................... 370/216, 222, 224, 225, 258
See application file for complete search history.

(56) References Cited

U.S. PATENT DOCUMENTS

| 7,944,815 | B2 * | 5/2011 | Thomson et al. | 370/222 |
| 2009/0046576 | A1 * | 2/2009 | Shand et al. | 370/217 |
| 2011/0292789 | A1 * | 12/2011 | Long et al. | 370/222 |

FOREIGN PATENT DOCUMENTS

| CN | 1747438 A | 3/2006 |
| CN | 101001263 A | 7/2007 |

OTHER PUBLICATIONS

International Search Report for PCT/CN2008/073798 dated Sep. 3, 2009.

* cited by examiner

*Primary Examiner* — Steven H Nguyen
*Assistant Examiner* — Henry Baron
(74) *Attorney, Agent, or Firm* — Nixon Peabody LLP; Joseph Bach, Esq.

(57) ABSTRACT

The present invention provides an address refreshing method and device of the Ethernet ring network, and the method comprises: when a current node state of each node in the Ethernet ring network is a protection state, if a failure of a first link in the Ethernet ring network disappears, transmitting a No Request (NR) protocol message indicating that the link failure disappears through node(s) connected with the first link; a node in the Ethernet ring network which receives the NR protocol message switching the node state of the node into a pending state; and when the current node state of each node in the Ethernet ring network is the pending state, if a link failure appears in the Ethernet ring network, transmitting a link failure notification (SF) protocol message through node(s) connected with the failed link; a node in the Ethernet ring network which receives the SF protocol message switching the node state of the node into the protection state, and refreshing an address forwarding table according to address refreshing information carried in the SF protocol message.

14 Claims, 8 Drawing Sheets

ADDRESS REFRESHING METHOD AND DEVICE OF ETHERNET RING NETWORK

CROSS-REFERENCE TO RELATED APPLICATIONS

This application is a National Phase of International Application No. PCT/CN2008/073798, which was filed on Dec. 27, 2008, and which claims priority to and the benefit of Chinese Patent Application No. 200810179018.7, filed on Nov. 25, 2008, and the disclosures of which are hereby incorporated herein by reference in their entireties.

FIELD OF THE INVENTION

The present invention relates to the communication field, in particular to an address refreshing method and device of Ethernet ring network.

BACKGROUND OF THE INVENTION

As the Ethernet develops towards multi-service bearer, especially some services become increasingly demanding on reliability and real-time performance of the network, the Ethernet employs a ring networking structure to improve the reliability of the network. In a protection method of the ring network, fast protection switching is usually required, and it is also required that the time for protection switching is less than 50 ms. At present, as to the fast protection switching technology, there are RFC3619 of the Internet Engineering Task Force (referred to as IETF), G.8032v1 of the International Telecommunication Union (referred to as ITU-T), and so on.

Figure 1:
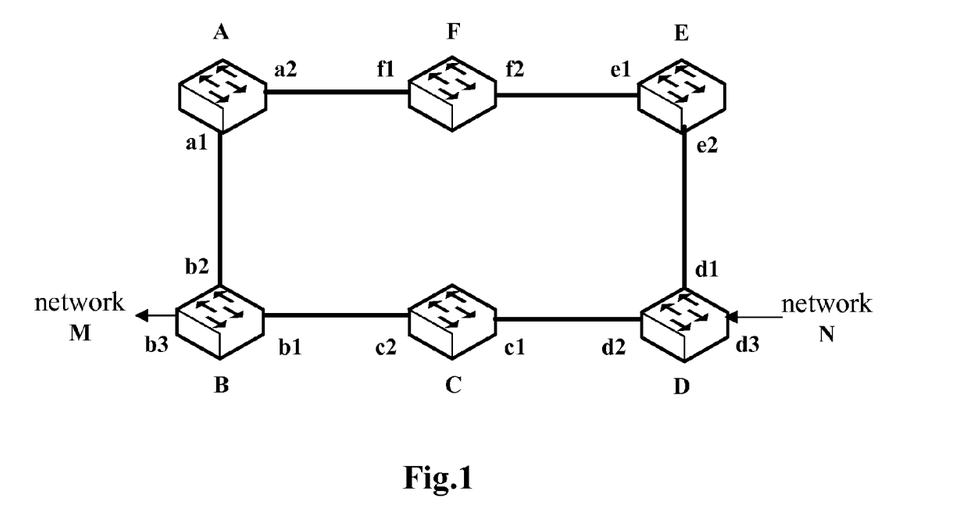
FIG. 1 is a topological diagram of the Ethernet ring network in the prior art.

FIG. 1 is a topological diagram of the Ethernet ring network according to the related art. As shown in FIG. 1, nodes A to F are nodes having a Ethernet switching function, a network M is connected with the node B, and a network N is connected with the node D. There are two physical paths between the network M and the network N, viz.

network N ↔ node D ↔ node C ↔ node B ↔ network M; and network N ↔ node D ↔ node E ↔ node F ↔ node A ↔ node B ↔ network M.

When the Ethernet ring protection technology is applied, a ring protection link and a control node are defined, viz. in the case that there is no failure in the Ethernet ring network, a link in the Ethernet ring network which blocks data messages to prevent the formation of a loop is a ring protection link. The switching between a primary path and a protection path of the Ethernet ring network can be carried out by performing operation on this ring protection link, wherein a node owning the ring protection link is referred to as a control node (or referred to as a master node).

Figure 2A:
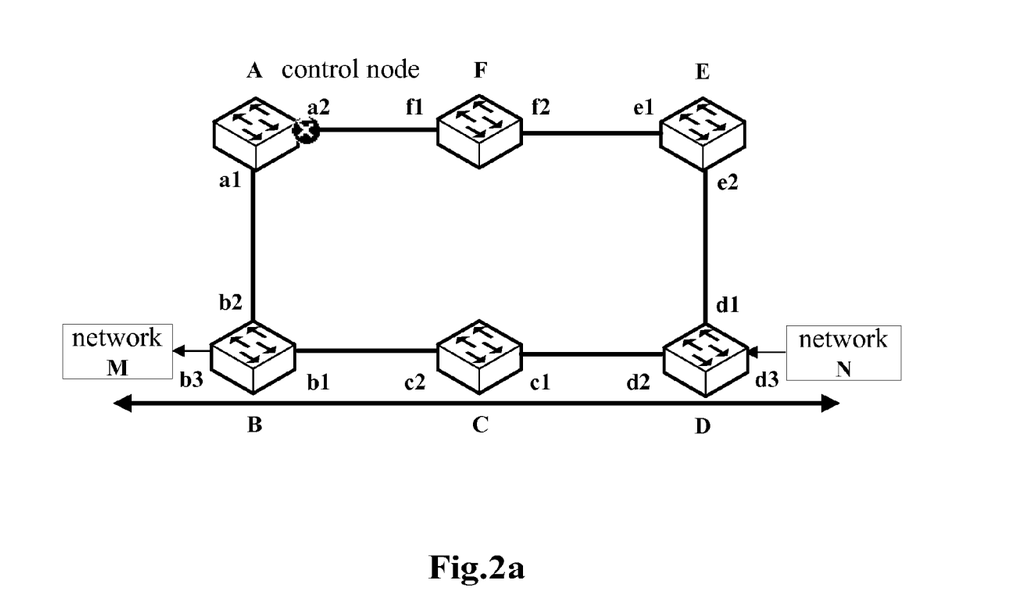
FIG. 2a is a topological diagram of the communication path when the links in the Ethernet ring network are in good condition in the prior art.

FIG. 2a is a topological diagram of the communication path when the links in the Ethernet ring network are in good condition in the prior art. As shown in FIG. 2a, the nodes included in the Ethernet ring network are nodes A, B, C, D, E and F, and the links included in the Ethernet ring network are links <A,B>, <B,C>, <C,D>, <D,E>, <E,F> and <F,A>, wherein the node A is the control node, and the link <F,A> directly connected to a port a2 is the ring protection link.

When the links in the Ethernet ring network are in good condition, the control node blocks a data message forwarding function of the port connected to the ring protection link, and no loop is generated in the network, which avoids "broadcast storm" caused by a network loop. As shown in FIG. 2a, the control node A blocks the data message forwarding function of the port a2, and the communication path between the network M and the network N is: network M ↔ node B ↔ node C ↔ node D ↔ network N.

Figure 2B:
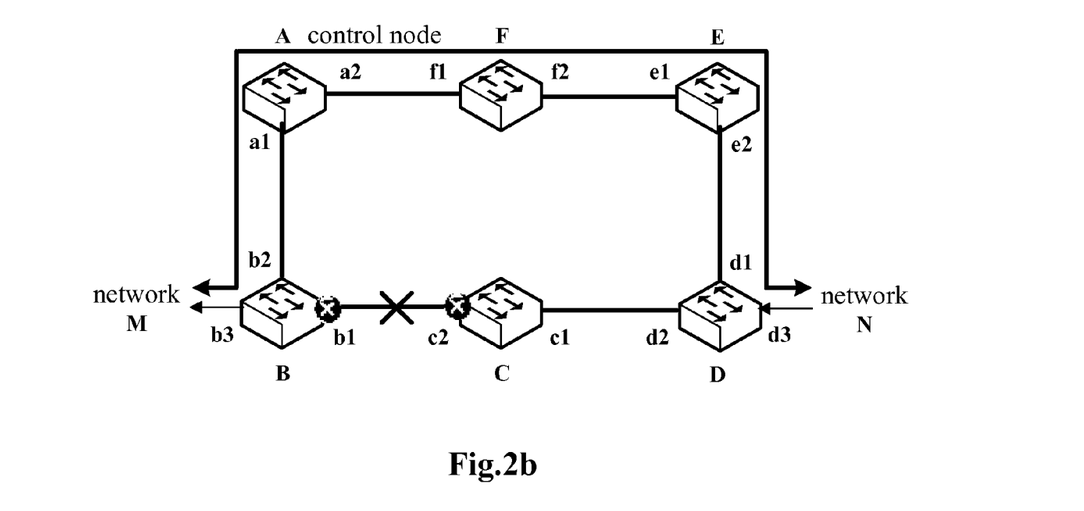
FIG. 2b is a topological diagram of the communication path when a failure occurs in a link in the Ethernet ring network in the prior art.

When a failure occurs in a link in the Ethernet ring network, the control node opens the data message forwarding function of the port at which the control node is connected with the ring protection link, which ensures the connectivity of the service. As shown in FIG. 2b, a failure occurs in the link <B,C> in the Ethernet ring network, the control node A releases the data message forwarding function of the port a2, and the new communication path between the network M and the network N is: network M ↔ node B ↔ node A ↔ node F ↔ node E ↔ node D ↔ network N.

When a link switching occurs in the Ethernet ring network (for example, a failure occurs in a link or the failure disappears), it is required to refresh an address forwarding table. The refreshing of the address forwarding table serves to prevent the nodes from using the path before the link switching to forward data messages, so as to avoid great loss of the data messages. As shown in FIG. 2a, in the case that there is no failure in the links in the Ethernet ring network, the path through which the network N transmits a data message to the network M is: network N→node D→node C→node B→network M. FIG. 2b is a topological diagram of the communication path when a failure occurs in a link in the Ethernet ring network in the prior art. As shown in FIG. 2b, when a failure occurs in the link <B,C>, if the forwarding table of the node D is not refreshed, the transmission of the data messages from the network N to the network M is still performed along the original path, these data messages are discarded at the node C, and this phenomenon continues until the node D learns the correct address of the node B. Thus, in the G.8032v1, it is the general practice to use the method of refreshing an address forwarding table to prevent the nodes from still using the path before the link switching to forward data messages.

In the G.8032v1, address refreshing information is usually indicated by a DNF field of a link failure notification (Signal Fail, referred to as SF) protocol message and of a No Request (referred to as NR) protocol message. These protocol messages are usually periodically transmitted by a source node, so that the Ethernet ring network is stable in one state. In the G.8032v1, a node only has an idle (IDLE) state and a protection (PROTECTION) state, which are respectively defined as follows.

IDLE state: there is no failure in the Ethernet ring network, the No Request-Ring Protection Link Blocked (referred to as NR-RB) protocol message periodically transmitted by the control node indicates that the ring protection link has blocked the forwarding of the data messages; and the nodes in the Ethernet ring network all enters the IDLE state after receiving the protocol message.

PROTECTION state: there is a failure in the Ethernet ring network, the node which detects the failure periodically transmits an SF protocol message; and the nodes in the Ethernet ring network which receive the SF protocol message enter the PROTECTION state.

Figure 3A:
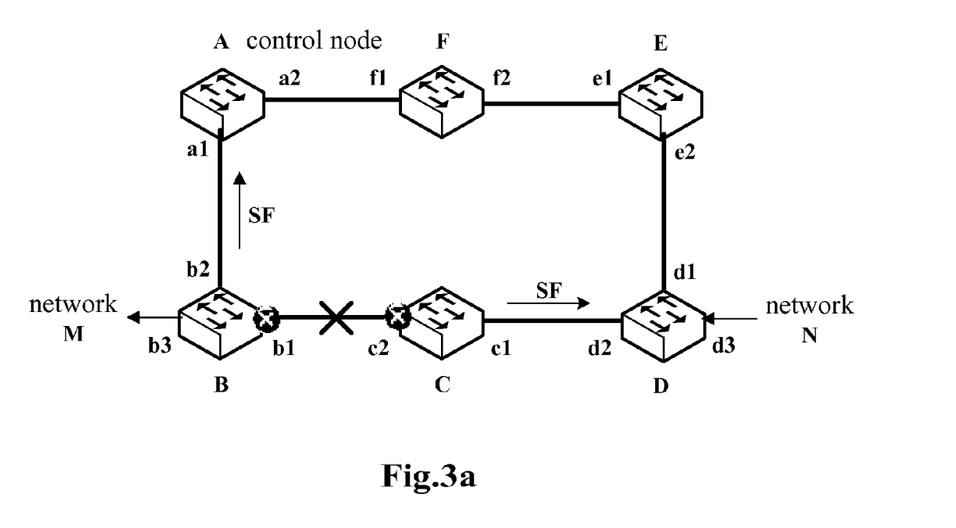
FIG. 3a is a schematic diagram of the transmission of the SF protocol message when a link failure appears in the Ethernet ring network in the prior art.

In order to prevent the nodes from repeatedly refreshing the address forwarding table, in the G.8032v1, it is agreed that, a node refreshes the address forwarding table only once in one node state. FIG. 3a is a schematic diagram of the transmission of the SF protocol message when a failure occurs in a link in the Ethernet ring network in the prior art. As shown in FIG. 3a, a failure occurs in the link <B,C> in the Ethernet ring network, the node B and the node C periodically transmit outwards the SF protocol messages along the port b2 and the port c1, respectively. Although the nodes D, E, F and A in the Ethernet ring network can constantly receive the SF protocol message, these nodes refresh the address forwarding table only once in the PROTECTION state, viz. the nodes refresh the address forwarding table when receiving the first SF protocol message in the PROTECTION state, and ignore the SF protocol messages received subsequently.

The above address refreshing mechanism (viz. the address forwarding table is refreshed only once in one state and the nodes only have two states, viz. the IDLE state and the PROTECTION state) operates properly under an inversion recovery mode, but malfunctions under a non-inversion recovery mode.

The inversion recovery mode indicates: when the failed link in the Ethernet ring network returns to normal, the forwarding of the data messages is blocked only at the port where the control node is connected to the ring protection link in the entire Ethernet ring network. The non-inversion recovery mode indicates: when the failed link in the Ethernet ring network returns to normal, for the entire Ethernet ring network, the port at which the forwarding of the data messages is blocked is not necessarily the port where the control node is connected to the ring protection link.

Under the inversion recovery mode, when the failure of the link <B,C> in the Ethernet ring network disappears, the nodes B and C periodically transmit outwards the NR protocol message along the port b2 and port c1, respectively, for indicating that the failure of the link disappears; after receiving the NR protocol message, the node A starts a timer, blocks data message forwarding function of the port a2 after the timer expires, and transmits an NR-RB protocol message; after receiving the NR-RB protocol message, each node in the Ethernet ring network enters the IDLE state, and refreshes the address forwarding table in accordance with the DNF field of the NR-RB protocol message.

Figure 3B:
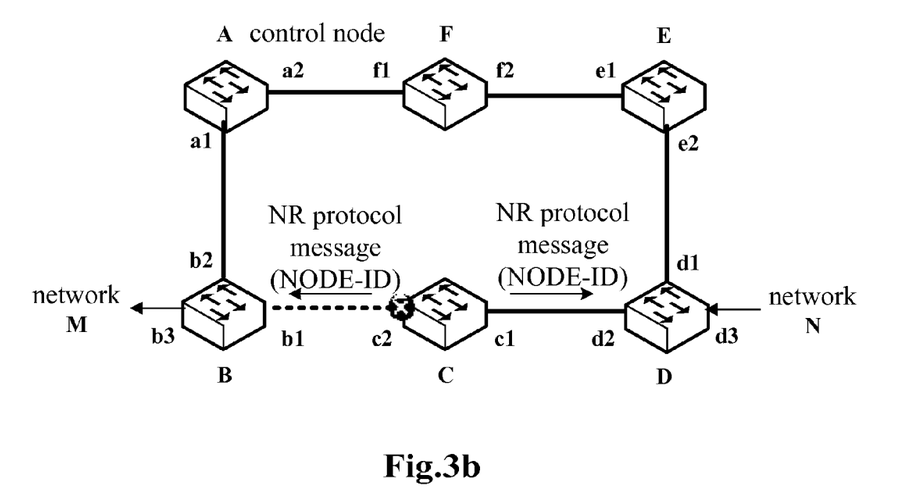
FIG. 3b is a schematic diagram of the non-inversion recovery of the Ethernet ring network in the prior art.
Figure 3C:
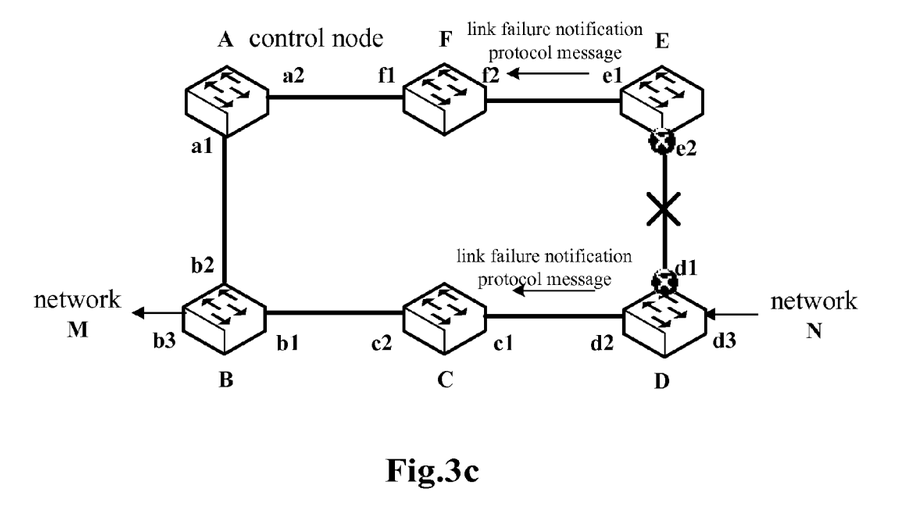
FIG. 3c is a schematic diagram of the case that, after one link in the Ethernet ring network is performed with the non-inversion recovery, a failure occurs in another link in the prior art.

However, under the non-inversion recovery mode, as shown in FIG. 3b, FIG. 3b is a schematic diagram of the non-inversion recovery of the Ethernet ring network in the prior art, when the failure of the link <B,C> in the Ethernet ring network disappears, the nodes B and C periodically transmit outwards an NR (NODE_ID) protocol message along the port b2 and port c1, respectively; when receiving the NR (NODE_ID) protocol message transmitted by the node C, the node B finds that the NODE_ID (node identifier) of the node C is greater than the NODE_ID of the node B, then, the node B stops transmitting the NR (NODE_ID) protocol message, and at the same time, opens the data message forwarding function of the port b1; the node C keeps blocking the data message forwarding function of the port c2. According to the provisions of node state in the G.8032v1, at this time, each node in the Ethernet ring network is still in the PROTECTION state, and will not refresh the address forwarding table. In this case, if a new failure occurs in the links in the Ethernet ring network at a later time, there will be a problem in the address refreshing of the node. FIG. 3c is a schematic diagram of the case that, after one link in the Ethernet ring network is performed with the non-inversion recovery, a failure occurs in another link in the prior art. As shown in FIG. 3c, after a period of time since the failure of the link <B,C> disappears, a failure occurs in the link <E,D> of the Ethernet ring network, the node E and the node D, after detecting the failure, periodically transmit outwards the SF protocol message along the port e2 and port d2, respectively, and after receiving the SF protocol message, the node C opens the data message forwarding function of the port c2. Since each node in the Ethernet ring network is still in the PROTECTION state at this time, none of the nodes will refresh the address forwarding table. However, as new changes have taken place in the topological structure of the Ethernet ring network, if the nodes in the Ethernet ring network do not refresh the address forwarding table, the data flow in the Ethernet ring network will be forwarded along the original path, viz. the path before changes have taken place in the topological structure of the Ethernet ring network (i.e. node B ↔ node A ↔ node F ↔ node E ↔ node D), and there will be a great loss of data.

From the above analysis, the use of the address refreshing method in the prior art under the non-inversion recovery mode will lead to data loss due to the failure in refreshing the address in time.

SUMMARY OF THE INVENTION

The present invention is provided in view of the problem of data loss due to the failure in refreshing the address in time under the non-inversion recovery mode. Thus, the present invention mainly aims at providing an improved address refreshing solution based on state switching.

In order to achieve the object of the invention, according to one aspect of the present invention, an address refreshing method of the Ethernet ring network is provided, the method comprising:

when a current node state of each node in the Ethernet ring network is a protection state, if a failure of a first link in the Ethernet ring network disappears, transmitting a No Request (NR) protocol message indicating that the link failure disappears through node(s) connected with the first link; a node in the Ethernet ring network which receives the NR protocol message switching the node state of the node into a pending state; and when the current node state of each node in the Ethernet ring network is the pending state, if a link failure appears in the Ethernet ring network, transmitting a link failure notification (SF) protocol message through node(s) connected with the failed link; a node in the Ethernet ring network which receives the SF protocol message switching the node state of the node into the protection state, and refreshing an address forwarding table according to address refreshing information carried in the SF protocol message.

In addition, when the current node state of each node in the Ethernet ring network is the protection state, if the failure of the first link disappears, blocking a data message forwarding function of one or more ports of the first link through the node(s) connected with the first link; and when the current node state of each node in the Ethernet ring network is the pending state, the link in which a failure appears being a second link; after the SF protocol message is received, opening the blocked data message forwarding function of the one or more ports of the first link through the node(s) connected with the first link.

In addition, when the current node state of each node in the Ethernet ring network is the protection state, if a failure of the first link disappears, switching the node state of a node whose state is the protection state into the pending state through the node(s) connected with the first link; and when the current node state of each node in the Ethernet ring network is the pending state, if a link failure appears in the Ethernet ring network, a node connected with the link in which the failure appears switching the node state of a node whose state is the pending state into the protection state.

In addition, when the current node state of each node in the Ethernet ring network is the pending state, if a link failure appears in the Ethernet ring network, a node connected with the link in which the failure appears refreshing the address forwarding table.

In addition, after receiving the NR protocol message indicating that the link failure disappears, a control node of the Ethernet ring network starting a wait-to-recover (WTR) timer, and transmitting, after the WTR timer expires, an NR protocol message indicating that a ring protection link has blocked the forwarding of a data message.

In addition, after receiving the NR protocol message indicating that the ring protection link has blocked the forwarding of the data message transmitted by the control node, each node in the Ethernet ring network whose current node state is the pending state switching the node state of the node into an idle state.

Moreover, after receiving the NR protocol message indicating that the ring protection link has blocked the forwarding of the data message transmitted by the control node, each node in the Ethernet ring network whose current node state is the pending state refreshing the address forwarding table according to address refreshing information carried in the NR protocol message.

Moreover, in the case that the nodes in the Ethernet ring network obtain a chance of address refreshing, the address forwarding table is refreshed according to an address refreshing instruction of a protocol message, wherein the scenes of obtaining the chance of address refreshing comprise at least one of the followings:

(A) the current node state of a node in the Ethernet ring network is an idle state, and the node detects a link failure or receives an SF protocol message;

(B) the current node state of a node in the Ethernet ring network is the pending state, and the node detects a link failure or receives an SF protocol message; and (C) the current node state of a node in the Ethernet ring network is the pending state, and a WTR timer started by the node expires, or the node receives an NR protocol message indicating that a ring protection link has blocked the forwarding of a data message.

According to another aspect of the present invention, an address refreshing device for the Ethernet ring network is provided.

The address refreshing device for the Ethernet ring network according to the present invention comprises: a first transmitting module, configured to, when a current node state of each node in the Ethernet ring network is a protection state, if a failure of a first link in the Ethernet ring network disappears, transmit a No Request (NR) protocol message indicating that the link failure disappears through node(s) connected with the first link; a first switching module, configured to switch the node state of a node in the Ethernet ring network which receives the NR protocol message into a pending state; a second transmitting module, configured to, when the current node state of each node in the Ethernet ring network is the pending state, if a link failure appears in the Ethernet ring network, transmit a link failure notification (SF) protocol message through node(s) connected with the failed link; a second switching module, configured to switch the node state of a node in the Ethernet ring network which receives the SF protocol message into the protection state; and an address refreshing module, configured to refresh an address forwarding table according to address refreshing information carried in the SF protocol message.

In conclusion, by introducing a new node state (PENDING state), the present invention solves the problem that the address refreshing cannot be performed in time under the non-inversion recovery mode.

DETAILED DESCRIPTION OF THE EMBODIMENTS

Brief Description on Functions

The basic idea of the embodiments of the present invention is introducing a new node state, viz. a pending (PENDING) state, the nodes in the Ethernet ring network in the PROTECTION state enter the PENDING state upon receiving the NR protocol message, and the nodes in the PENDING state enter the PROTECTION state upon receiving the SF protocol message; moreover, only when the nodes undergo the node state switching of IDLE to PROTECTION, PENDING to IDLE (only limited to the inversion recovery mode), or PENDING to PROTECTION, the nodes refresh the address forwarding table according to the address refreshing information carried in the protocol message.

The above three node states are respectively defined as follows.

The IDLE state: there is no failure in the Ethernet ring network, and an NR-RB protocol message periodically transmitted by the control node indicates that the ring protection link has blocked the forwarding of the data message; and the nodes in the Ethernet ring network enters the IDLE state after receiving the protocol message.

The PROTECTION state: there is a failure in the Ethernet ring network, and the node which detects the failure periodically transmits an SF protocol message; and the nodes in the Ethernet ring network which receive the SF protocol message enter the PROTECTION state.

The PENDING state: there is no failure in the Ethernet ring network, and one or both of the nodes at the two ends of the original failed link continues blocking the data message forwarding function of the port of the original failed link, and periodically transmits an NR protocol message; and the nodes in the Ethernet ring network which receive the NR protocol message enter the PENDING state.

It shall be explained that the node(s) mentioned in the present invention is the node(s) in the Ethernet ring network, the node(s) in the Ethernet ring network cannot directly enter the IDLE state from the PROTECTION state, but need to enter the PROTECTION state from the PENDING state, which is different from the prior art.

The preferred embodiments are described in conjunction with the drawings as follows. It shall be understood that the preferred embodiments described herein are only used to describe and explain the present invention without restricting the present invention. The embodiments of the present invention and the features of the embodiments can be combined with each other if there is no conflict.

Method Embodiments

According to an embodiment of the present invention, an address refreshing method of the Ethernet ring network is provided.

The address refreshing method according to an embodiment of the present invention includes:

1. when the current node state of each node in the Ethernet ring network is the protection state, if a failure of a first link in the Ethernet ring network disappears, a no request (NR) protocol message indicating that the link failure disappears is transmitted through node(s) connected with the first link; a node in the Ethernet ring network which receives the NR protocol message indicating that the link failure disappears switches its node state into the pending state;

2. when the current node state of each node in the Ethernet ring network is the pending state, if a link failure appears in the Ethernet ring network, a link failure notification (Signal Fail, referred to as SF) protocol message is transmitted through node(s) connected with the failed link; a node in the Ethernet ring network which receives the SF protocol message switches its node state into the protection state, and refreshes an address forwarding table according to address refreshing information carried in the SF protocol message.

Figure 4:
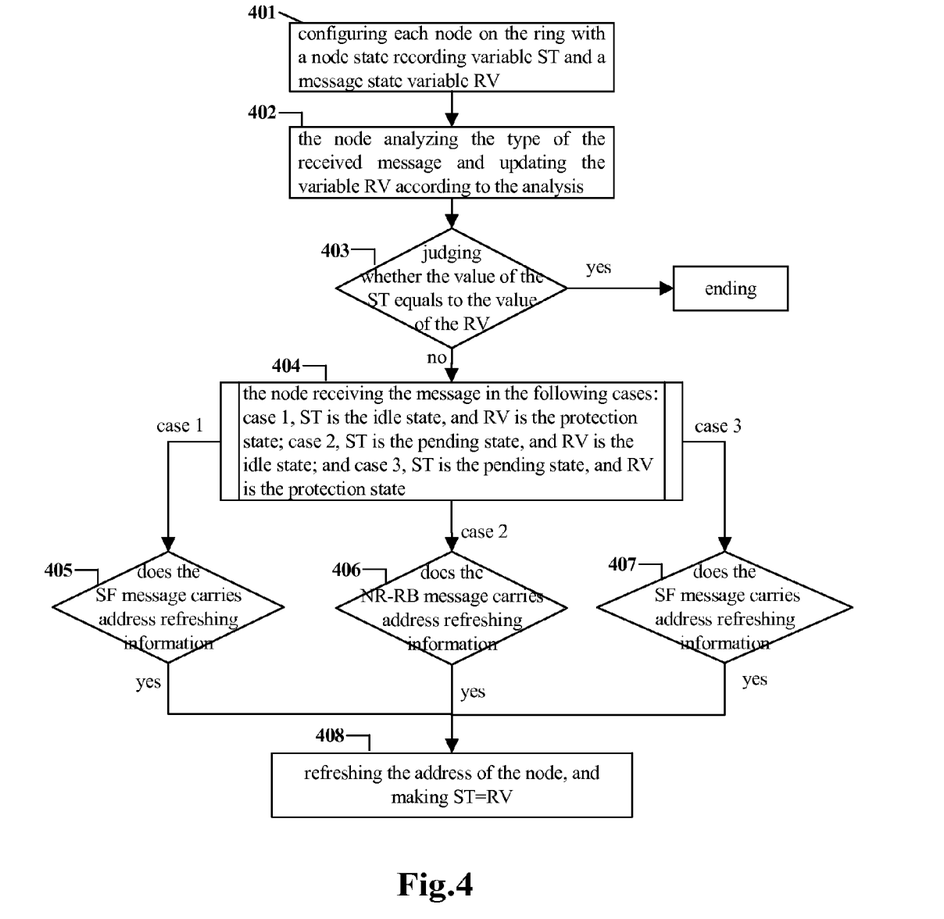
FIG. 4 is a flow chart of a preferred processing solution of the address refreshing method of the Ethernet ring network according to an embodiment of the present invention.

The address refreshing method according to the embodiment of the present invention is described in detail in conjunction with FIG. 4. FIG. 4 is a flow chart of a preferred processing solution of the address refreshing method of the Ethernet ring network according to an embodiment of the present invention. As shown in FIG. 4, the processing flow comprises the steps (step 401-step 408) as follows.

Step 401, each node in the Ethernet ring network is configured with two state variables, one is a node state recording variable ST, and the other is a message state recording variable RV.

Step 402, when receiving a protocol message, the node determines the value of the message state recording variable RV according to the type of the protocol message.

For example, when receiving an SF protocol message, for the node, RV=PROTECTION; when receiving an NR protocol message, for the node, RV=PENDING; and when receiving an NR-RB protocol message, for the node, RV=IDLE.

Step 403, the node judges whether the RV equals to the ST; if not, step 404 is performed; otherwise, the flow ends.

Step 404, the node judges the values of the RV and the ST:
 if ST=IDLE and RV=PROTECTION (case 1), step 405 is performed;
 if ST=PENDING and RV=IDLE (case 2), step 406 is performed;
 if ST=PENDING and RV=PROTECTION (case 3), step 407 is performed; otherwise, the flow ends.

Step 405, for the case 1, the node examines an address refreshing field of the received SF protocol message, and judges whether the node needs to perform refreshing; if yes, refreshes the address forwarding table.

Figure 5A:
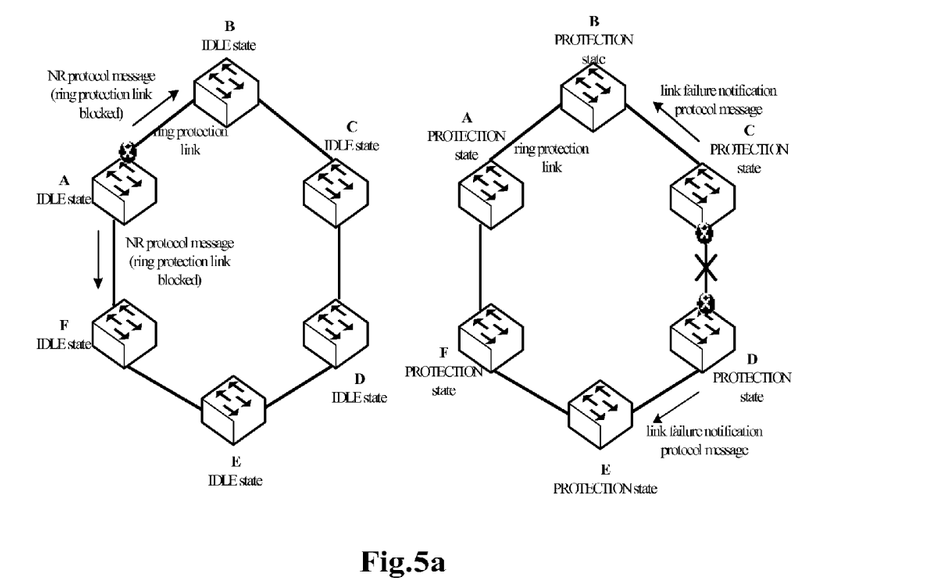
FIG. 5a is a schematic diagram showing that a node enters the PROTECTION state from the IDLE state according to an embodiment of the present invention.

FIG. 5a is a schematic diagram showing that a node enters the PROTECTION state from the IDLE state according to an embodiment of the present invention. As shown in FIG. 5a, each node in the Ethernet ring network is initially in the IDLE state; when a failure appears in the link <C,D>, the nodes C and D periodically transmit outwards an SF protocol message; after receiving the SF protocol message, other nodes in the Ethernet ring network record the value of the RV as the PROTECTION state; the nodes in the Ethernet ring network compare the value of the ST with that of the RV, examine the address refreshing information of the received SF protocol message upon finding that the nodes enter the PROTECTION state from the IDLE state, and refresh the address forwarding table if the refreshing is necessary.

Step 406, for the case 2, the node examines an address refreshing field of the received NR-RB protocol message, and judges whether the node needs to perform refreshing; if yes, refreshes the address forwarding table.

Figure 5B:
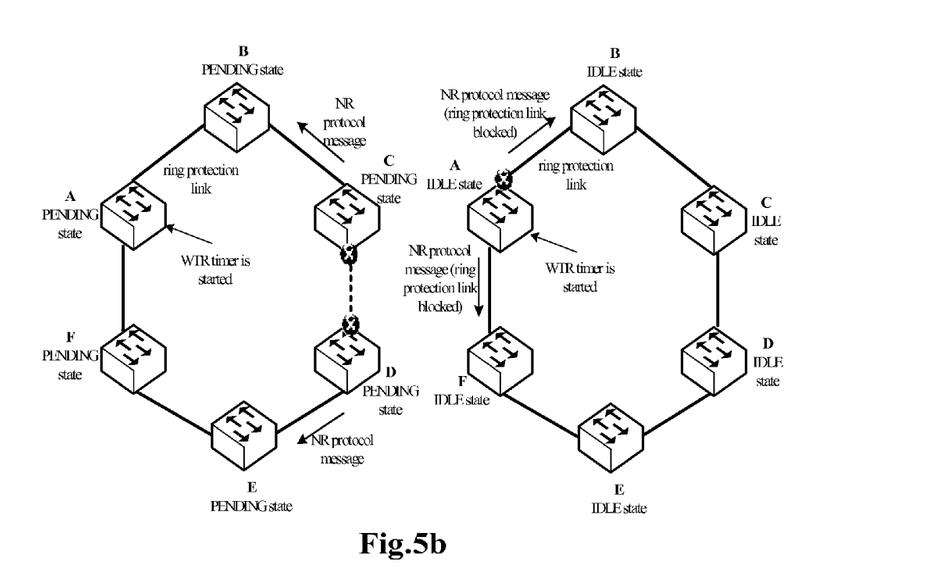
FIG. 5b is a schematic diagram showing that a node enters the IDLE state from the PENDING state according to an embodiment of the present invention.

FIG. 5b is a schematic diagram showing that a node enters the IDLE state from the PENDING state according to an embodiment of the present invention. As shown in FIG. 5b, each node in the Ethernet ring network is initially in the PENDING state; the nodes C and D periodically transmit an NR protocol message; after receiving the NR protocol message, the control node starts a wait-to-recover (referred to as WTR) timer; after the WTR timer expires, the control node A periodically transmits outwards an NR-RB protocol message (i.e. no request protocol message (ring protection link blocked)); after receiving the NR-RB protocol message, the nodes in the Ethernet ring network record the value of the RV as the IDLE state; the nodes in the Ethernet ring network compare the value of the ST with the value of the RV, examine the address refreshing information of the received NR-RB protocol message upon finding that the nodes enter the IDLE state from the PENDING state, and refresh the address forwarding table if the refreshing is necessary.

Step 407, for the case 3, the node examines an address refreshing field of the received SF protocol message, and judges whether the node needs to perform refreshing, if yes, refreshes the address forwarding table.

Figure 5C:
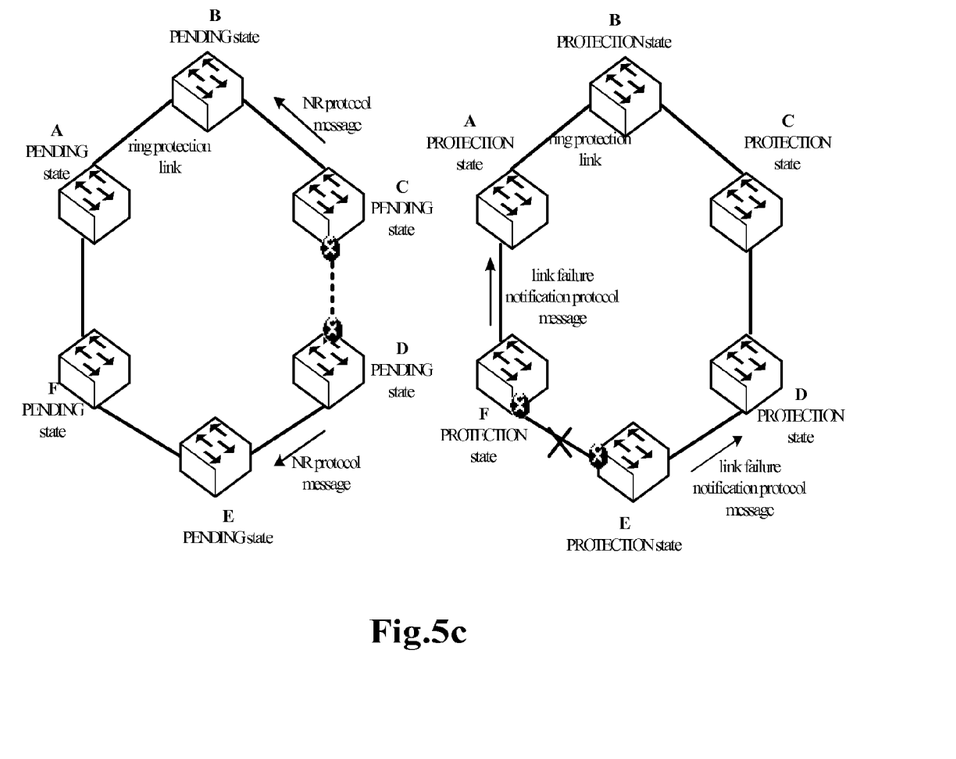
FIG. 5c is a schematic diagram showing that a node enters the PROTECTION state from the PENDING state according to an embodiment of the present invention.

FIG. 5c is a schematic diagram showing that a node enters the PROTECTION state from the PENDING state according to an embodiment of the present invention. As shown in FIG. 5c, the Ethernet ring network employs the non-inversion recovery mode, each node is initially in the PENDING state, and the node C and the node D periodically transmit an NR protocol message; when a failure occurs in the link <F,E>, the nodes F and E periodically transmit outwards an SF protocol message; after receiving the SF protocol message, other nodes in the Ethernet ring network record the value of the RV as the PROTECTION state; the nodes in the Ethernet ring network compare the value of the ST with the value of the RV, examine the address refreshing information of the received SF protocol message upon finding that the nodes enter the PROTECTION state from the PENDING state, and refresh the address forwarding table if the refreshing is necessary.

Step 408, the node updates the node state recorded in the ST as the message state recorded in the RV.

It shall be explained that the operations of state switching and address refreshing performed by the nodes which transmit the protocol message are omitted in the above flow. For example, when each node is currently in the PENDING state, after detecting the failure of the link <C,D>, the nodes C and D set their node state recording variable ST as PROTECTION, for indicating that the nodes C and D currently enter the PROTECTION state. Of course, anyone of the nodes C and D also can set the node state recording variable ST as PROTECTION after receiving the SF protocol message transmitted from the other one. Likewise, anyone of the nodes C and D can refresh the address forwarding table either before transmitting the SF protocol message, or after receiving the SF protocol message transmitted from the other one.

Application Examples

The embodiment of the present invention is described as follows by taking a scene in which the non-inversion recovery is performed after a single point of failure occurs in the Ethernet ring network, and then a failure occurs in another link as an example. FIGS. 6a, 6b, 6c and 6d are schematic diagrams of the application examples of the address refreshing method based on state switching according to the embodiments of the present invention. Detailed description is given as follows in conjunction with FIGS. 6a to 6d.

As shown in FIGS. 6a and 6b, each node in the Ethernet ring network is initially in the IDLE state; when a failure occurs in the link <C,D>, the nodes C and D refresh the address forwarding table after detecting the failure, record the value of the RV as the PROTECTION state, and periodically transmit outwards an SF protocol message; other nodes in the Ethernet ring network record the value of the RV as the PROTECTION state after receiving the SF protocol message, and each node in the Ethernet ring network compares the value of the ST and the value of the RV, examines the address refreshing information of the received SF protocol message upon finding that the node enters the PROTECTION state from the IDLE state, and refreshes the address forwarding table if finding that the address forwarding table needs to be refreshed.

As shown in FIG. 6c, when the failure in the link <C,D> disappears, after detecting that the failure disappears, the node C and/or the node D continue blocking the data message forwarding function of the original failed port (now the failure has disappeared), and record the value of the RV as PENDING, and periodically transmit outwards an NR protocol message; other nodes in the Ethernet ring network record the value of the RV as the PENDING state after receiving the protocol message, and each node in the Ethernet ring network compares the value of the ST and the value of the RV, and finds that the node enters the PENDING state from the PROTECTION state (this state switching indicates that there is no need to perform address refreshing by the node), and thereby, the nodes in the Ethernet ring network do not refresh the address forwarding table.

As shown in FIG. 6d, a failure occurs in the link <F,E> in the Ethernet ring network. The nodes F and E block the forwarding of data messages of the failed port after detecting the failure, record the value of the RV as the PROTECTION state, refresh the address forwarding table, and periodically transmit outwards an SF protocol message; after receiving the SF protocol message, other nodes in the Ethernet ring network record the value of the RV as the PROTECTION state, meanwhile, the node C and the node D open the data message forwarding function; each node in the Ethernet ring network compares the value of the ST and the value of the RV, examines the address refreshing information of the received SF protocol message upon finding that the node enters the PROTECTION state from the PENDING state, and refreshes the address forwarding table of each node if finding that the address forwarding table needs to be refreshed.

Apparatus Embodiments

According to an embodiment of the present invention, an address refreshing device of the Ethernet ring network is also provided, and the device is capable of implementing the address refreshing method provided in the above method embodiments.

Figure 7:
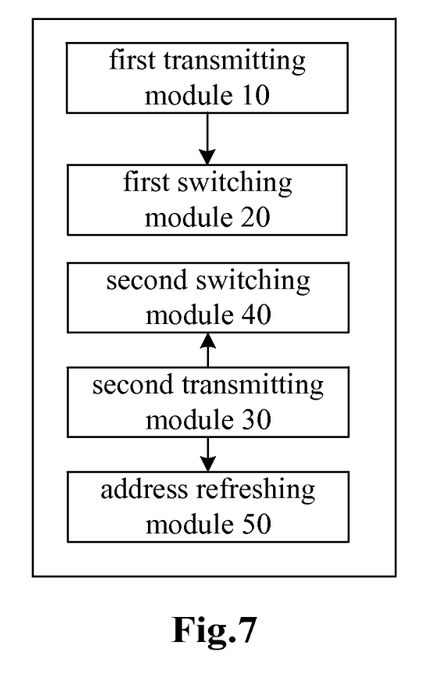
FIG. 7 is a block diagram of the address refreshing device of the Ethernet ring network according to an embodiment of the present invention.

FIG. 7 is a block diagram of the address refreshing device of the Ethernet ring network according to an embodiment of the present invention. As shown in FIG. 7, the device includes: a first transmitting module 10, a first switching module 20, a second transmitting module 30, a second switching module 40, and an address refreshing module 50. Each of the modules is described in detail as follows.

The first transmitting module 10 is configured to, when the current node state of each node in the Ethernet ring network is the protection state, if a failure of a first link in the Ethernet ring network disappears, transmit a No Request (NR) protocol message indicating that the link failure disappears through node(s) connected with the first link.

The first switching module 20 is connected to the first transmitting module 10, and is configured to switch the node state of a node in the Ethernet ring network which receives the NR protocol message to the pending state.

The second transmitting module 30 is configured to, when the current node state of each node in the Ethernet ring network is the pending state, if a link failure appears in the Ethernet ring network, transmit a link failure notification SF protocol message through node(s) connected with the failed link.

The second switching module 40 is connected to the second transmitting module 30, and is configured to switch the node state of a node in the Ethernet ring network which receives the SF protocol message to the protection state.

The address refreshing module 50 is connected to the second transmitting module 30, and is configured to refresh an address forwarding table according to address refreshing information carried in the SF protocol message.

Figure 6:
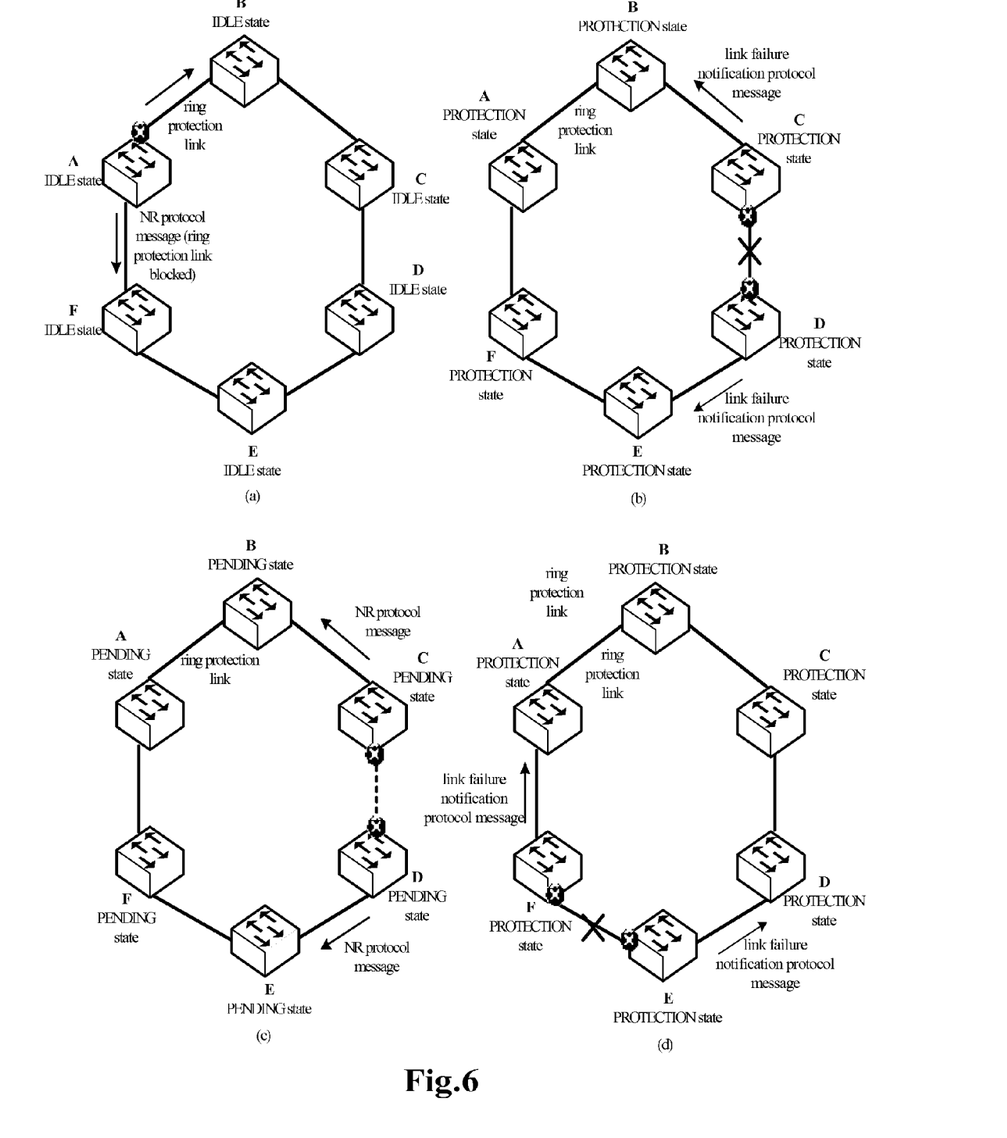
FIGS. 6a, 6b, 6c and 6d are schematic diagrams of the application examples of the address refreshing method based on state switching according to the embodiments of the present invention.

In the specific implementing process, the device provided in the embodiments of the present invention likewise can accomplish the processing shown in FIGS. 4-6, and the specific processing procedure will not be repeated herein.

In conclusion, by means of the technical solutions of the embodiments of the present invention, by introducing a new node state (the PENDING state), the problem that the address refreshing cannot be performed in time under the non-inversion recovery mode is settled.

Obviously, those skilled in the art shall appreciate, all of the above modules or steps of the present invention can be realized by a universal computing device, they can be concentrated in a single computing device, or distributed in the network consisting of several computing devices, preferably, they can be realized by program codes executable by the computing device, such that they can be stored in a storage device to be executed by the computing device, or each of them can be manufactured into an integrated circuit module, or several modules or steps of them can be manufactured into a single integrated circuit module. In this way, the present invention is not limited to the combination of any particular hardware and software.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of the present invention.

What is claimed is:

1. An address refreshing method of an Ethernet ring network, comprising:

when a current node state of each node in the Ethernet ring network is a protection state, if a failure of a first link in the Ethernet ring network disappears, transmitting a No Request (NR) protocol message indicating that the link failure disappears through node(s) connected with the first link; a node in the Ethernet ring network which receives the NR protocol message switching the node state of the node into a pending state; and when the current node state of each node in the Ethernet ring network is the pending state, if a link failure appears in the Ethernet ring network, transmitting a link failure notification (SF) protocol message through node(s) connected with the failed link; a node in the Ethernet ring network which receives the SF protocol message switching the node state of the node into the protection state, and refreshing an address forwarding table according to address refreshing information carried in the SF protocol message; and after receiving the NR protocol message indicating that the link failure disappears, a control node of the Ethernet ring network starting a wait-to-recover (WTR) timer, and transmitting, after the WTR timer expires, an NR protocol message indicating that a ring protection link has blocked the forwarding of a data message.

2. The method according to claim 1, further comprising:

when the current node state of each node in the Ethernet ring network is the protection state, if the failure of the first link disappears, blocking a data message forwarding function of one or more ports of the first link through the node(s) connected with the first link; and when the current node state of each node in the Ethernet ring network is the pending state, the link in which a failure appears being a second link; after the SF protocol message is received, opening the blocked data message forwarding function of the one or more ports of the first link through the node(s) connected with the first link.

3. The method according to claim 2, further comprising: when the current node state of each node in the Ethernet ring network is the protection state, if a failure of the first link disappears, switching the node state of a node whose state is the protection state into the pending state through the node(s) connected with the first link; and when the current node state of each node in the Ethernet ring network is the pending state, if a link failure appears in the Ethernet ring network, a node connected with the link in which the failure appears switching the node state of a node whose state is the pending state into the protection state.

4. The method according to claim 3, further comprising:

when the current node state of each node in the Ethernet ring network is the pending state, if a link failure appears in the Ethernet ring network, a node connected with the link in which the failure appears refreshing the address forwarding table.

5. The method according to claim 1, further comprising:

after receiving the NR protocol message indicating that the ring protection link has blocked the forwarding of the data message transmitted by the control node, each node in the Ethernet ring network whose current node state is the pending state switching the node state of the node into an idle state.

6. The method according to claim 5, further comprising:

after receiving the NR protocol message indicating that the ring protection link has blocked the forwarding of the data message transmitted by the control node, each node in the Ethernet ring network whose current node state is the pending state refreshing the address forwarding table according to address refreshing information carried in the NR protocol message.

7. The method according to claim 1, wherein, in the case that the nodes in the Ethernet ring network obtain a chance of address refreshing, the address forwarding table is refreshed according to an address refreshing instruction of a protocol message, wherein the scenes of obtaining the chance of address refreshing comprise at least one of the followings:

the current node state of a node in the Ethernet ring network is an idle state, and the node detects a link failure or receives an SF protocol message;

the current node state of a node in the Ethernet ring network is the pending state, and the node detects a link failure or receives an SF protocol message; and the current node state of a node in the Ethernet ring network is the pending state, and a WTR timer started by the node expires, or the node receives an NR protocol message indicating that a ring protection link has blocked the forwarding of a data message.

8. An address refreshing device of an Ethernet ring network, comprising:

a first transmitting module, configured to, when a current node state of each node in the Ethernet ring network is a protection state, if a failure of a first link in the Ethernet ring network disappears, transmit a No Request (NR) protocol message indicating that the link failure disappears through node(s) connected with the first link;

a first switching module, configured to switch the node state of a node in the Ethernet ring network which receives the NR protocol message into a pending state;

a second transmitting module, configured to, when the current node state of each node in the Ethernet ring network is the pending state, if a link failure appears in the Ethernet ring network, transmit a link failure notification (SF) protocol message through node(s) connected with the failed link;

a second switching module, configured to switch the node state of a node in the Ethernet ring network which receives the SF protocol message into the protection state; and an address refreshing module, configured to refresh an address forwarding table according to address refreshing information carried in the SF protocol message.

9. The method according to claim 2, wherein, in the case that the nodes in the Ethernet ring network obtain a chance of address refreshing, the address forwarding table is refreshed according to an address refreshing instruction of a protocol message, wherein the scenes of obtaining the chance of address refreshing comprise at least one of the followings:

the current node state of a node in the Ethernet ring network is an idle state, and the node detects a link failure or receives an SF protocol message;

the current node state of a node in the Ethernet ring network is the pending state, and the node detects a link failure or receives an SF protocol message; and the current node state of a node in the Ethernet ring network is the pending state, and a WTR timer started by the node expires, or the node receives an NR protocol message indicating that a ring protection link has blocked the forwarding of a data message.

10. The method according to claim 3, wherein, in the case that the nodes in the Ethernet ring network obtain a chance of address refreshing, the address forwarding table is refreshed according to an address refreshing instruction of a protocol message, wherein the scenes of obtaining the chance of address refreshing comprise at least one of the followings:
- the current node state of a node in the Ethernet ring network is an idle state, and the node detects a link failure or receives an SF protocol message;
- the current node state of a node in the Ethernet ring network is the pending state, and the node detects a link failure or receives an SF protocol message; and
- the current node state of a node in the Ethernet ring network is the pending state, and a WTR timer started by the node expires, or the node receives an NR protocol message indicating that a ring protection link has blocked the forwarding of a data message.

11. The method according to claim 4, wherein, in the case that the nodes in the Ethernet ring network obtain a chance of address refreshing, the address forwarding table is refreshed according to an address refreshing instruction of a protocol message, wherein the scenes of obtaining the chance of address refreshing comprise at least one of the followings:
- the current node state of a node in the Ethernet ring network is an idle state, and the node detects a link failure or receives an SF protocol message;
- the current node state of a node in the Ethernet ring network is the pending state, and the node detects a link failure or receives an SF protocol message; and
- the current node state of a node in the Ethernet ring network is the pending state, and a WTR timer started by the node expires, or the node receives an NR protocol message indicating that a ring protection link has blocked the forwarding of a data message.

12. The method according to claim 1, wherein, in the case that the nodes in the Ethernet ring network obtain a chance of address refreshing, the address forwarding table is refreshed according to an address refreshing instruction of a protocol message, wherein the scenes of obtaining the chance of address refreshing comprise at least one of the followings:
- the current node state of a node in the Ethernet ring network is an idle state, and the node detects a link failure or receives an SF protocol message;
- the current node state of a node in the Ethernet ring network is the pending state, and the node detects a link failure or receives an SF protocol message; and
- the current node state of a node in the Ethernet ring network is the pending state, and a WTR timer started by the node expires, or the node receives an NR protocol message indicating that a ring protection link has blocked the forwarding of a data message.

13. The method according to claim 5, wherein, in the case that the nodes in the Ethernet ring network obtain a chance of address refreshing, the address forwarding table is refreshed according to an address refreshing instruction of a protocol message, wherein the scenes of obtaining the chance of address refreshing comprise at least one of the followings:
- the current node state of a node in the Ethernet ring network is an idle state, and the node detects a link failure or receives an SF protocol message;
- the current node state of a node in the Ethernet ring network is the pending state, and the node detects a link failure or receives an SF protocol message; and
- the current node state of a node in the Ethernet ring network is the pending state, and a WTR timer started by the node expires, or the node receives an NR protocol message indicating that a ring protection link has blocked the forwarding of a data message.

14. The method according to claim 6, wherein, in the case that the nodes in the Ethernet ring network obtain a chance of address refreshing, the address forwarding table is refreshed according to an address refreshing instruction of a protocol message, wherein the scenes of obtaining the chance of address refreshing comprise at least one of the followings:
- the current node state of a node in the Ethernet ring network is an idle state, and the node detects a link failure or receives an SF protocol message;
- the current node state of a node in the Ethernet ring network is the pending state, and the node detects a link failure or receives an SF protocol message; and
- the current node state of a node in the Ethernet ring network is the pending state, and a WTR timer started by the node expires, or the node receives an NR protocol message indicating that a ring protection link has blocked the forwarding of a data message.

* * * * *